(12) United States Patent
Chamdani et al.

(10) Patent No.: US 7,110,394 B1
(45) Date of Patent: Sep. 19, 2006

(54) PACKET SWITCHING APPARATUS INCLUDING CASCADE PORTS AND METHOD FOR SWITCHING PACKETS

(75) Inventors: Joseph I. Chamdani, Santa Clara, CA (US); Michael Corwin, Sunnyvale, CA (US); Matthew Rogge, Stanford, CA (US)

(73) Assignee: Sanera Systems, Inc., Broomfield, CO (US)

( * ) Notice: Subject to any disclaimer, the term of this patent is extended or adjusted under 35 U.S.C. 154(b) by 1131 days.

(21) Appl. No.: 09/892,216

(22) Filed: Jun. 25, 2001

(51) Int. Cl.
*H04L 12/66* (2006.01)
*H04L 12/50* (2006.01)

(52) U.S. Cl. .............. 370/355; 370/366; 370/388; 370/466

(58) Field of Classification Search .......... 370/353, 370/354, 355, 359, 366, 388, 343, 413, 422, 370/423, 419, 414, 415
See application file for complete search history.

(56) References Cited

U.S. PATENT DOCUMENTS

| | | | |
|---|---|---|---|
| 5,905,725 A * | 5/1999 | Sindhu et al. ............. 370/389 |
| 6,400,730 B1 * | 6/2002 | Latif et al. ................. 370/466 |
| 6,427,173 B1 * | 7/2002 | Boucher et al. ........... 709/238 |
| 6,477,619 B1 * | 11/2002 | Fujimoto et al. .......... 711/114 |
| 6,504,820 B1 * | 1/2003 | Oliva ........................ 370/232 |
| 6,542,507 B1 * | 4/2003 | Khacherian et al. ... 370/395.43 |
| 6,580,709 B1 * | 6/2003 | Gorshe et al. ............ 370/352 |
| 6,597,689 B1 * | 7/2003 | Chiu et al. ................ 370/354 |
| 6,658,504 B1 * | 12/2003 | Lieber et al. .............. 710/52 |
| 6,665,495 B1 * | 12/2003 | Miles et al. ................ 398/54 |
| 6,724,757 B1 * | 4/2004 | Zadikian et al. ........... 370/388 |
| 6,754,206 B1 * | 6/2004 | Nattkemper et al. ....... 370/369 |
| 6,792,502 B1 * | 9/2004 | Pandya et al. ............. 711/108 |
| 6,904,053 B1 * | 6/2005 | Berman ..................... 370/466 |
| 2004/0073676 A1 * | 4/2004 | Honma et al. ............ 709/226 |
| 2005/0050240 A1 * | 3/2005 | Wilkins et al. ............. 710/15 |
| 2005/0182838 A1 * | 8/2005 | Sheets et al. ............. 709/226 |

OTHER PUBLICATIONS

GR-253-CORE, Synchronous Optical Network (SONET) Transport Systems: Common Generic Criteria, Sep. 2000, Telcordia Technologies, Issue 3, Chapter 3.*
Series G:Transmission System and Media, Digital Systems and networks, Architecture of Transport networks based on the synchronous digital hierachy (SDH), ITU-T receeommendation G.803, Mar. 2000.*
Howard Berkowitz, Designing Routing and Switching Architeuctures; Chapter 9, connection-oriented switching, pp. 507-511, 1999, Network Architecture and Development Series, MacMillan Technical Plublishing.*

(Continued)

*Primary Examiner*—Doris H. To
*Assistant Examiner*—Ian N. Moore
(74) *Attorney, Agent, or Firm*—Hensley Kim & Edgington, LLC

(57) ABSTRACT

A switching device comprises at least two base racks, each base rack including a switch card in communication with a line card across a backplane, the line card having at least an external port. The at least two base racks are coupled such that the switch cards of each are linked. A method for switching a packet comprises introducing the packet into an external port on a first base rack, transmitting the packet from a first cascade port on the first base rack to a second cascade port on a second base rack, and sending the packet out of the second base rack through a second external port.

27 Claims, 7 Drawing Sheets

OTHER PUBLICATIONS

U.S. Appl. No. 09/944,425, Joseph Chamdani et al.
U.S. Appl. No. 09/943,842, Joseph Chamdani et al.
U.S. Appl. No. 09/943,660, Joseph Chamdani et al.
U.S. Appl. No. 09/895,288, Joseph Chamdani et al.
Henry Baltazar, "Deciphering NAS, SAN storage wars," EWEEK, Apr. 9, 2001, p. 26, Ziff Davis Publishing, Inc., New York, New York, United States of America.
Fibre Channel Systems, "Overview of the Technology" (visited Apr. 3, 2001) <http://www.fibrechannel.com/technology/overview.html>.
Dunstan, Adam et al., Reliable Backbone Bandwidth Using Composite Links White Paper (visited Dec. 14, 2001) <http://www.avici.com/technology/whitepapers/reliable_backbone.pdf>.
Ottem, Erik, Sans for High Availability Systems White Paper, Gadzoox Networks, Inc. (2001).
Avici Systems, Inc. The Use of Composite Links to Facilitate the Creation of a New Optical Adaptation Layer White Paper (visited Dec. 14, 2001) <http://www.avici.com/technology/whitepapers/Composite_links.pdf>.
Goldworm, Barb, "The difference between SANs and NAS," Networkworldfusion, Oct. 2, 2000 <http://www.nwfusion.com/newsletters/stor/2000/1002stor1.html>.
IBM, Inc., "SAN Basics" (visited Apr. 3, 2001) <http://www.storage.ibm.com/ibmsan/basics.htm>.
Dot Hill Systems Corp., "SAN Tutorial" (visited Apr. 3, 2001) <http://www.the-storage-in.com/topic01.htm>.
Shah, Rawn, "Storage beyond RAID,"Connectivity (visited Apr. 3, 2001) <http://www.unixinsider.com/unixinsideronline/swol-07-1999/swol-07-connectivity_p.html>.
Techencyclopedia, SAN (visited Apr. 3, 2001) <http://www.techweb.com/encyclopedia/defineterm?term=SAN>.
Infrastor Technologies Corp., "Introduction to SAN" (visited Apr. 3, 2001) <http://www.infrastor.com/tech/SANTechIntro.htm>.
Infrastor Technologies Corp., "SAN Capabilities" (visited Apr. 3, 2001) <http://www.infrastor.com/tech/capabilities.htm>.
Zeichick, Alan, "4 Storage Area Networks," INTERNETWEEK, Sep. 25, 2000 <http://www.internetwk.com/reviews00/rev092500.htm>.
Fetters, Dave, "Why a SAN," Network Computing, May 15, 2000 <http://www.networkcomputing.com/1109/1109ws1.html>.
Fetters, Dave, "The Fabric of Your Life," Network Computing, May 15, 2000 <http://www.networkcomputing.com/1109/1109ws12.html>.
Fetters, Dave, "Storage Options," Network Computing, May 15, 2000 <http://www.networkcomputing.com/1109/1109ws13.html>.

* cited by examiner

PACKET SWITCHING APPARATUS INCLUDING CASCADE PORTS AND METHOD FOR SWITCHING PACKETS

BACKGROUND

1. Field of the Invention

The present invention relates generally to data transmission, and more particularly to packet switching between various devices within a network.

2. Description of the Prior Art

With early networked storage systems, files are made available to the network by attaching storage devices to a server, which is sometimes referred to as Direct Attached Storage (DAS). In such a configuration, the server controls and "owns" all of the data on its attached storage devices. A shortcoming of a DAS system is that when the server is off-line or not functioning properly, its storage capability and its associated files are unavailable.

At least the aforementioned shortcoming in DAS systems led to Network Attached Storage (NAS) technology and associated systems, in which the storage devices and their associated NAS server are configured on the "front-end" network between an end user and the DAS servers. Thus, the storage availability is independent of a particular DAS server availability and the storage is available whenever the network is on-line and functioning properly. A NAS system typically shares the Local Area Network (LAN) bandwidth, therefore a disadvantage of a NAS system is the increased network traffic and potential bottlenecks surrounding the NAS server and storage devices.

At least the aforementioned shortcoming in NAS systems led to Storage Area Networking (SAN) technology and associated systems. In SAN systems, storage devices are typically connected to the DAS servers through a separate "back-end" network switch fabric (i.e., the combination of switching hardware and software that control the switching paths).

With the deployment of prior SAN technologies in the growing enterprise-class computing and storage environment, several challenges are recognized which have no solutions prior to the present invention. One such challenge is to provide a scalable system wherein thousands of storage devices can be interconnected. One existing solution is to cascade together a multitude (tens to hundreds) of small SAN switches, which results in scenarios where a multitude of hops are required to reach a destination. Performance (e.g., latency and bandwidth) and reliability suffer in such an existing solution. Additionally, a configuration that includes hundreds of interconnected switches is also inherently difficult to manage and to diagnose faults therein, both from a hardware and software perspective. Still further, since no available SAN protocol is truly ubiquitous enough to be readily integrated with other networking architectures in a heterogeneous SAN environment, bridges and conversion equipment are needed, which increases the cost and management of such a system.

FIG. 1 shows a block diagram of a Storage Area Network 100 of the prior art connected to a client 110 through an Internet 112. The SAN 100 includes an IP router 114, an IP switch 116, a plurality of servers 118, 120, 122, and different storage media represented as Redundant Arrays of Inexpensive Disks (RAID) 126, Just a Bunch of Disks (JBOD) 128, 130, and tape back-up 132, connected to the separate "back-end" network switch fabric 134 described above.

The network switch fabric 134 includes one or more base racks (not shown) capable of switching signals. Each base rack includes a number of ports such that a signal received into one port can be directed to an appropriate destination port coupled to a destination component such as a server 118 or a RAID 126. Base racks ideally include a large numbers of ports to be able to simultaneously switch multiple signals amongst multiple components, however, 8 and 16 port base racks are most common. Multiple base racks can be used to form a network switch fabric 134 to provide redundancy, to increase switching capacity, or to accommodate more components than can be handled by a single base rack.

FIG. 2 illustrates how two base racks 200, 201 of the prior art can be cascaded together as part of a network switch fabric 134. Base racks 200, 201 each include a plurality of line cards 202, each including a plurality of ports. Each line card 202 is connected through a backplane 203 to a switch card 204. Some of the ports on the first base rack 200 are connected to ports on second base rack 201 by connectors 205, of which only one is shown for simplicity. Accordingly, even though the two base racks 200, 201 together may include 32 ports, since some ports are dedicated to connecting the two base racks together the number of ports available as input and destination ports is correspondingly reduced.

In some instances, a packet received into a port of first base rack 201 may be addressed to a component that is not directly connected to a port of base rack 201, and therefore would need to be switched to another base rack having such a port connection. Accordingly, FIG. 2 also illustrates how a packet introduced into a port of the first base rack 200 would be routed to a port on the second base rack 201. After ingress, for example through port 0 coupled to a line card #0 202, the packet passes through the backplane 203 to a switch card 204. Switch card 204 sends the packet back through the backplane 203 and through line card #1 202 to another port, here port 15, that is dedicated to communicating with the second base rack 201. The packet then travels over connector 205 and enters second base rack 201 at another port, here port 23. Lastly, the packet is sent from a third line card #0 202 in second base rack 201 to a second switch card 204 and finally to a fourth line card #1 202 from which it emerges through the appropriate port. It will be appreciated that a modern SAN 100 may comprise hundreds to thousands of transmission lines, and accordingly, to switch a packet between any two of these transmission lines requires cascading together potentially hundreds of base racks 200 in the manner shown.

It will be appreciated that not only is the number of useful ports reduced by cascading in such a fashion, but a packet that must be switched through more than one base rack 200 will traverse two additional line cards 202 for each additional base rack 201 it must pass through. Accordingly, what is desired is a faster and more efficient switching device with a greater proportion of useful ports.

SUMMARY

A switching device comprises at least two base racks, each base rack including a switch card in communication with a line card across a backplane, the line card having at least one port capable of receiving and transmitting a packet. The at least two base racks are coupled such that the switch cards of each are in communication. By allowing for direct communication between switch cards of different base racks, the present invention avoids the use of line card ports to tie together multiple base racks, making these ports available as external ports to link to various devices. Further, by allowing for direct communication between switch cards of different base racks, the present invention also shortens the path that a packet must travel between an input port and a destination port. The path is shortened by reducing the number of line cards the packet must pass through in each base rack.

A system area network comprises a switching device of the present invention and additionally comprises a storage device and a server, each coupled to a port of a line card on a different base rack.

A method for switching a packet comprises communicating or otherwise introducing a packet into a switching device through an ingress port of a first line card of a first base rack, transmitting the packet from the first line card through a first backplane to a first switch card on the first base rack, transmitting the packet from a first cascade port on the first switch card to a second cascade port on a second switch card of a second base rack, transmitting the packet through a second backplane to a second line card on the second base rack, and transmitting the packet out of the switching device through a egress port of the second base rack.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF ASPECTS OF THE INVENTION

Figure 3:
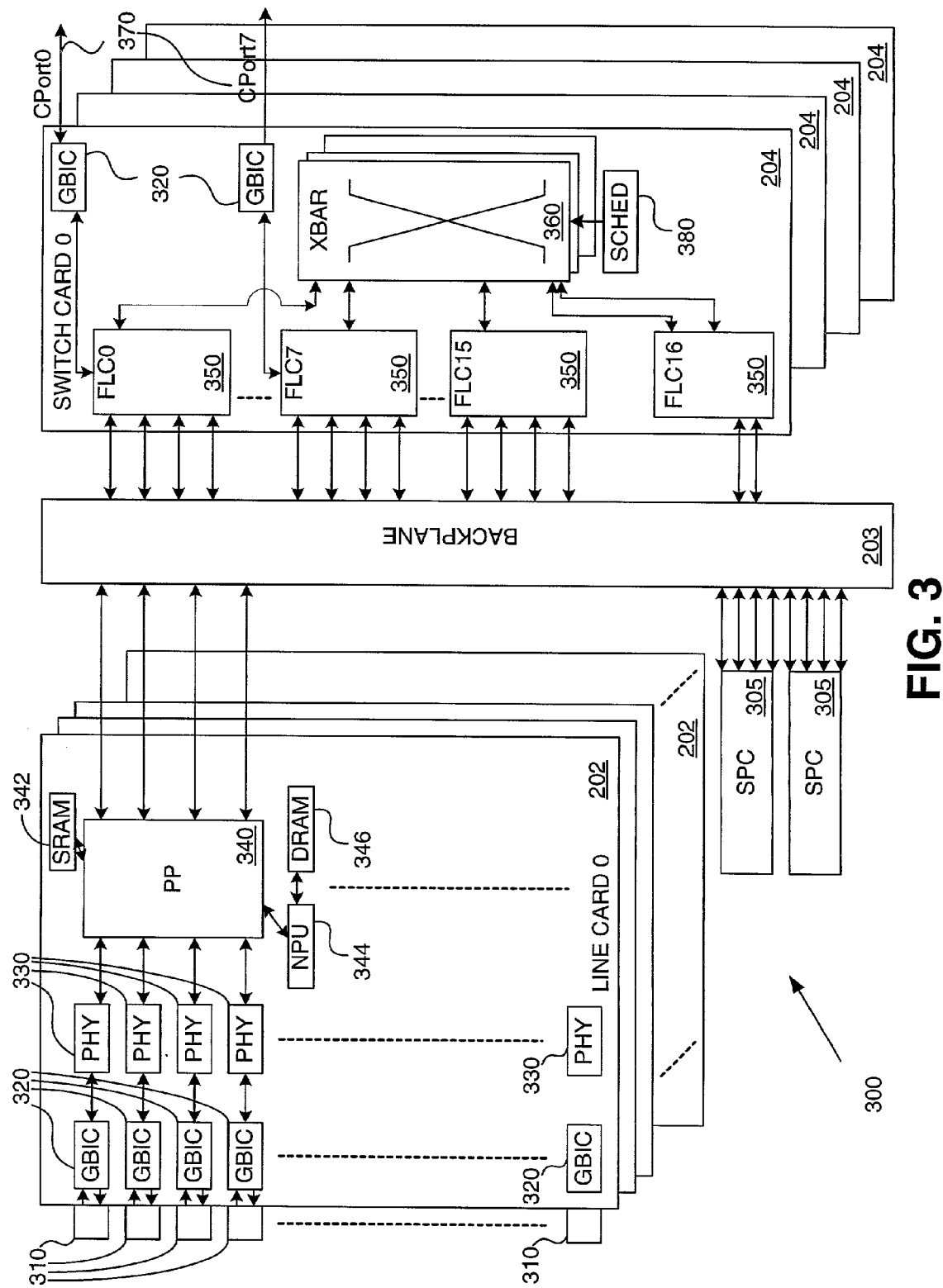
FIG. 3 is a logical diagram of a base rack in accordance with an embodiment of the present invention.

FIG. 3 is a logical diagram illustrating a base rack 300 of the present invention. The base rack 300 includes one or more line cards 202 in communication with one or more switch cards 204 across a backplane 203, and one or more Service Processor Cards (SPC) 305 also in communication via backplane 203. Each line card 202 includes one or more ports 310 for receiving and transmitting packets. Each port 310 is coupled in series first to a Gigabit Interface Converter (GBIC) 320, then to a PHY chip 330, and lastly to a Packet Processing ASIC (PP) 340. The PP 340 is further coupled to SRAM 342, to a Network Processor Unit (NPU) 344 coupled to a DRAM 346, and to the backplane 203. Each switch card 204 includes one or more Flow Control ASICs (FLC) 350 coupled to the backplane 203. Each FLC 350 is coupled to a crossbar 360 and further coupled to a GBIC 320 coupled to a cascade port 370.

The line card 202 is responsible for all packet processing, as described below, before forwarding the packet in one or many cells to a switch card 204 via backplane 203. In preferred embodiments, the base rack 300 includes 4 or 16 line cards. It will be appreciated that the number of line cards per base rack 300 is preferably a power of two, such as 4, 8, 16, 32, and so forth, however, the present invention is not limited to such numbers and can be configured to work with any number of line cards 202.

Packet processing performed by line card 202 includes Layer 1 to Layer 7 processing. Layer 1 processing is also known as physical layer processing and includes optical to electrical and vice versa conversions, and serial-differential to parallel-digital and vice versa conversions. Layers 2 and 3 include protocol conversion processing. For example, a class of conversion processes known as encapsulation relies on a common protocol layer. When the common protocol layer is the Ethernet layer the conversion is performed as Layer 2 processing, whereas if the common protocol layer is the IP layer the conversion is performed as Layer 3 processing. Another class of conversion process, known as direct translation, is an example of Layer 4 processing and is used when it is not clear that there is a common layer. Here, a common layer, for instance a Terminal Control Protocol (TCP) layer, is created.

Each line card 202 supports a plurality of ports 310, for example 16 ports per line card 202. It will likewise be appreciated that the number of ports 310 per line card 202 is preferably also a power of two, however, the present invention is not limited to such numbers and any number of ports 310 per line card 202 can be made to work. Examples of ports 310 that are preferred for the present invention include 1X, 4X, and 12X InfiniBand™ (IB) ports, 1 Gbps and 10 Gbps Gigabit Ethernet (GE) ports, and 1 Gbps and 2 Gbps Fibre Channel (FC) ports, where IB, GE, and FC represent three different common networking protocols used to communicate between network devices. In a preferred embodiment, the 12X port will support a line rate of up to 30 Gbps.

Ports 310 are generally arranged in sets of four, along with their associated GBICs 320 and PHY chips 330, into a unit referred to as a paddle (not shown). Different paddles on the same line card 202 can be configured with different kinds of ports 310 so that a single line card 202 can support many different port types. It will be understood that although bi-directional ports are preferred, the present invention can be implemented with single-direction ports.

Each GBIC 320 serves to convert an optical signal received from an optical fiber cable at the port 310 into a high-speed serial differential electrical signal. In preferred embodiments each GBIC 320 can also convert an electrical signal to an optical signal. The particular GBIC 320 component selected for a particular device should be matched to the port type and port speed. Examples of GBIC's 320 that can be used in the present invention include, among other possibilities, those capable of supporting the following protocols; 1X-IB, 4X-IB, 1GE, 10GE, FC-1G, and FC-2G.

The PHY chip 330 serves to perform a variety of physical layer conversions such as conversion from high-speed serial differential to slower parallel digital and vice versa, clock recovery, framing, and 10 b/8 b decoding (66 b/64 b decoding for 10GE ports). In a preferred embodiment, each PHY chip 330 provides one to four 8-bit data links.

Each PHY chip 330 is connected to a Packet Processing ASIC (PP) 340, as described above. In preferred embodiments, a PP 340 can handle the traffic of four ports 310. Preferably, there are four PPs 340 on each line card 202, each capable of handling up to 40 Gbps of ingress traffic, however, it will be understood that the present invention may be implemented with other numbers of PPs 340 per line card 202.

Each PP 340 is configured to handle both fast-path and slow-path packet processing. For fast-path packet processing, a newly received packet is buffered internally in an asynchronous First In First Out (FIFO) ingress buffer before its header is sent to a packet processing block, the main processor of the PP 340. The packet processing block can be IB or GE, for example, depending on the ASIC configuration setting. The packet processing block performs Layer 2 and Layer 3 processing, and additionally handles the logic for media access control, packet header parsing, destination port mapping, packet classification, and error handling as needed.

Slow-path packet processing may be used for processing at the upper layers (Layers 3–7), as may be needed, for example, for packets transmitted according to the FC protocol. The packet's header and a portion of its payload are sent to the NPU 344. Together, the PP 340 and NPU 344 form an intelligent packet forwarding engine. The NPU 344 consists of multiple CPU cores and is accompanied by DRAM 346, typically in the range of 256 MB to 8 GB. A commercially available NPU 344 is the SiByte (now part of Broadcom) 1 GHz Mercurian processor including two MIPS-64 CPU cores. Slow-path packet processing can include, for example, protocol conversion via TCP done by the NPU 344 in firmware. Other examples of intelligent packet processing utilizing the NPU 344 include server bypassing, global RAID, etc. The NPU 344 also is responsible for handling management and control packets as needed.

Each PP 340 is further coupled to an SRAM 342 chip and to the backplane 203. For dynamic packet buffering, it is desirable for SRAM 342 to have high bandwidth. An 8 MB SRAM 342 running at 250 MHz double data rate (DDR) with a 32-byte data bus is preferred. It will be understood that the present invention may be implemented with other SRAM chips 342. The connection between PP 340 and backplane 203 is preferably made through four bi-directional 10 Gbps backplane links.

Service Processor Cards (SPC) 305 are generally responsible for initial system configurations, subnet management, maintaining overall routing tables, health monitoring with alarm systems, performance monitoring, local/remote system administration access, system diagnostics, a variety of exception handlings, and for handling application software that is not otherwise run on an LC 202. Accordingly, an SPC can be viewed as a special version of an LC 202 and preferably has the same general design as an LC 202.

In preferred embodiments, the base rack 300 includes 2 or 4 switch cards 204. Switch cards 204 of the present invention preferably utilize a cell-based packet switching architecture. Accordingly, each switch card 204 includes one or more Flow Control ASICs (FLC) 350 coupled to the backplane 203. Each FLC 350 is coupled to at least one single-stage crossbar 360 and further coupled to a GBIC 320 coupled to a cascade port 370.

An FLC 350 consists mainly of on-chip SRAMs and is coupled to the backplane 203 preferably by a set of four parallel bi-directional differential links. Each FLC 350 is responsible for the flow control queuing between the backplane 203 and the at least one crossbar 360, including maintaining input/output queues, credit-based flow control for the link between a PP 340 and the FLC 350, cascade port logic, and sending requests to/receiving grants from a crossbar scheduler chip 380 connected to crossbar 360. In preferred embodiments each switch card 204 includes 16 FLCs 350 to handle communications with the PPs 340, and an additional FLC 350 dedicated to the SPCs 305, through backplane 203.

Each switch card 204 includes a crossbar 360, and in a preferred embodiment five crossbars 360 per switch card 204 are employed. The crossbar 360 is an ASIC design and in one implementation, handles cell switching among 66 input and 66 output ports, each having a bandwidth of 2 Gbps.

In preferred embodiments each FLC 350 is coupled to a GBIC 320 which is coupled to a cascade port 370. It will be appreciated, however, that in some embodiments not every FLC 350 is coupled to a GBIC 320 or a cascade port 370, as shown in FIG. 3, and in those embodiments any FLC 350 not coupled to a GBIC 320 will also not be coupled to a cascade port 370. Cascade ports 370 allow switch cards 204 on different base racks 300 to be coupled together, as will be discussed below with reference to FIGS. 4 and 5. Cascade ports 370 are also used by SPCs 305 for traffic management between base racks 300 where the CPU in one SPC 305 on a first base rack 300 is communicating with another CPU in another SPC 305 on a second base rack 300. Cascade ports 370 are preferably implemented using high-density, small form-factor 12X parallel fibers capable of 30 Gbps. For example, a 12X InfiniBand™ port offers 12 lines per direction, or a total of 24 lines per 12X port.

Figure 4:
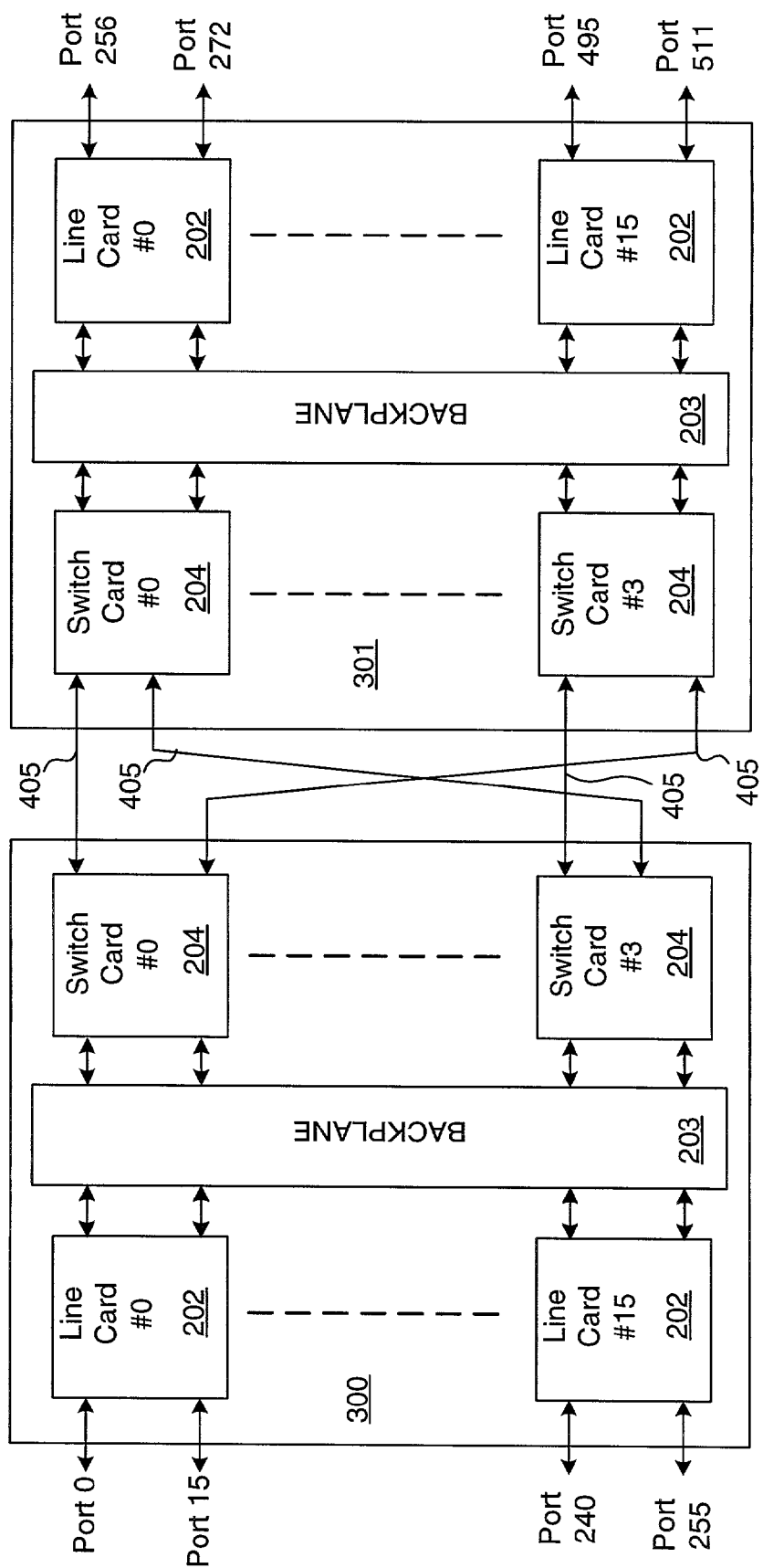
FIG. 4 is a block diagram of an embodiment of a switching device of the present invention comprising two base racks.

FIG. 4 is a block diagram illustrating one embodiment of a switching device 400 of the present invention comprising a local base rack 300 and a remote base rack 301. Each of the two base racks 300, 301 includes 16 line cards 202 each with 16 ports capable of receiving and transmitting packets. Each base rack 300, 301 further includes four switch cards 204 in communication with the 16 line cards 202 across a backplane 203. The two base racks 300, 301 are coupled such that each of the switch cards 204 of each base rack 300, 301 are in communication with every other switch card 204 of the other base rack 301, 300 by way of connectors 405.

Figure 5:
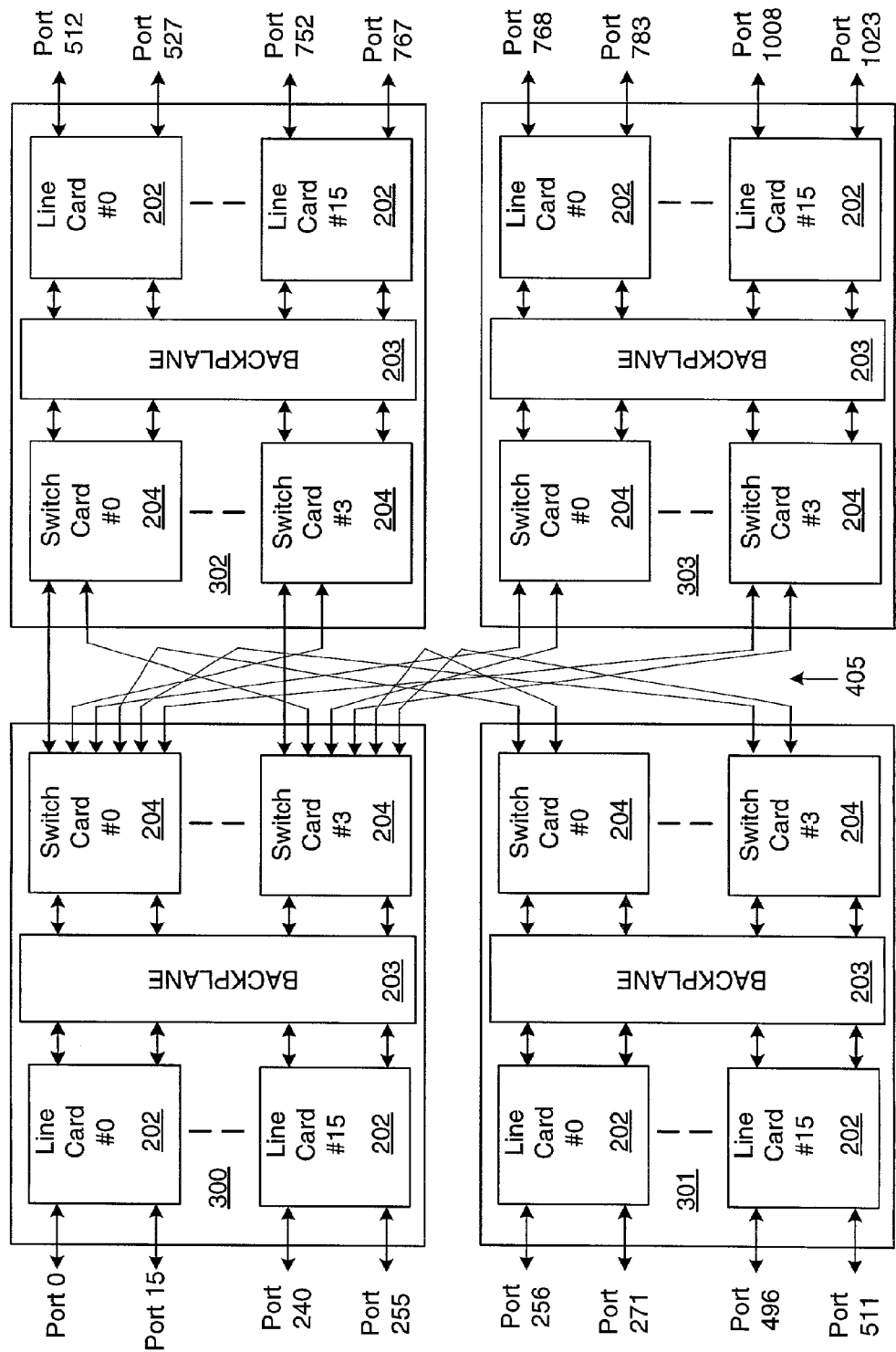
FIG. 5 is a block diagram of an embodiment of a switching device of the present invention comprising four base racks.

Similarly, FIG. 5 is a block diagram illustrating one embodiment of a switching device 500 of the present invention comprising a local base rack 300 and three remote base racks 301, 302, 303. Each of the four base racks 300, 301, 302, 303 includes 16 line cards 202 each with 16 ports capable of receiving and transmitting packets. Each base rack 300, 301, 302, 303 further includes four switch cards 204 in communication with the 16 line cards 202 across a backplane 203. The four base racks 300, 301, 302, 303 are coupled such that each of the switch cards 204 of each base rack 300, 301, 302, 303 are in communication with every other switch card 204 of the other three base racks by way of connectors 405. It will be understood that in this embodiment, and the previous embodiment described with reference to FIG. 4, the designations of local and remote are arbitrary, with "local" designating the base rack 300 that includes the input port and "remote" designating any other base rack 301, 302, 303 containing the target destination port.

It should be noted that although preferred embodiments of the present invention connect each switch card 204 on each base rack 300 to every other switch card 204 on the other base rack 301, the present invention also includes all permutations involving fewer connections. For example, the present invention can be configured so that only one switch card 204 on each base rack 300 is connected to a single switch card 204 on the other base rack 301. As another example, each switch card 204 on a base rack 300 can be connected to every other switch card 204 on each of the other base racks 301, 302, 303, while none of the switch cards on base racks 301, 302, 303 are connected together.

It will be appreciated by those skilled in the art that fiber optic cables are preferred for connectors 405 because they offer low signal attenuation, are less susceptible to noise, and are compact and highly flexible and therefore easier to install. Of course, electrically conductive connectors 405 can also be employed. By way of example, a 12× copper cable without equalization can generally carry data to approximately 7 meters, and with equalization from a filter network can extend that distance to approximately 17 meters. On the other hand, a 12× optical fiber cable using a short wave length (SX) will maintain good signal quality up to 125 meters, and with a long wave length (LX) can be extended to the order of kilometers. Fiber optic ports and connectors therefore allow base racks 300 of the present invention to be located further apart and even located in separate buildings.

12× optical connectors 405 typically comprise a pair of transmitter and receiver modules. Suitable modules are available from PicoLight, for instance transmitter module PL-TCP-00-S53-00 and receiver module PL-RCP-00-S53-00. Other suitable modules are commercially available from Mitel, for example transmitter module MFT-62540 and receiver module MFR-52540.

Figure 6:
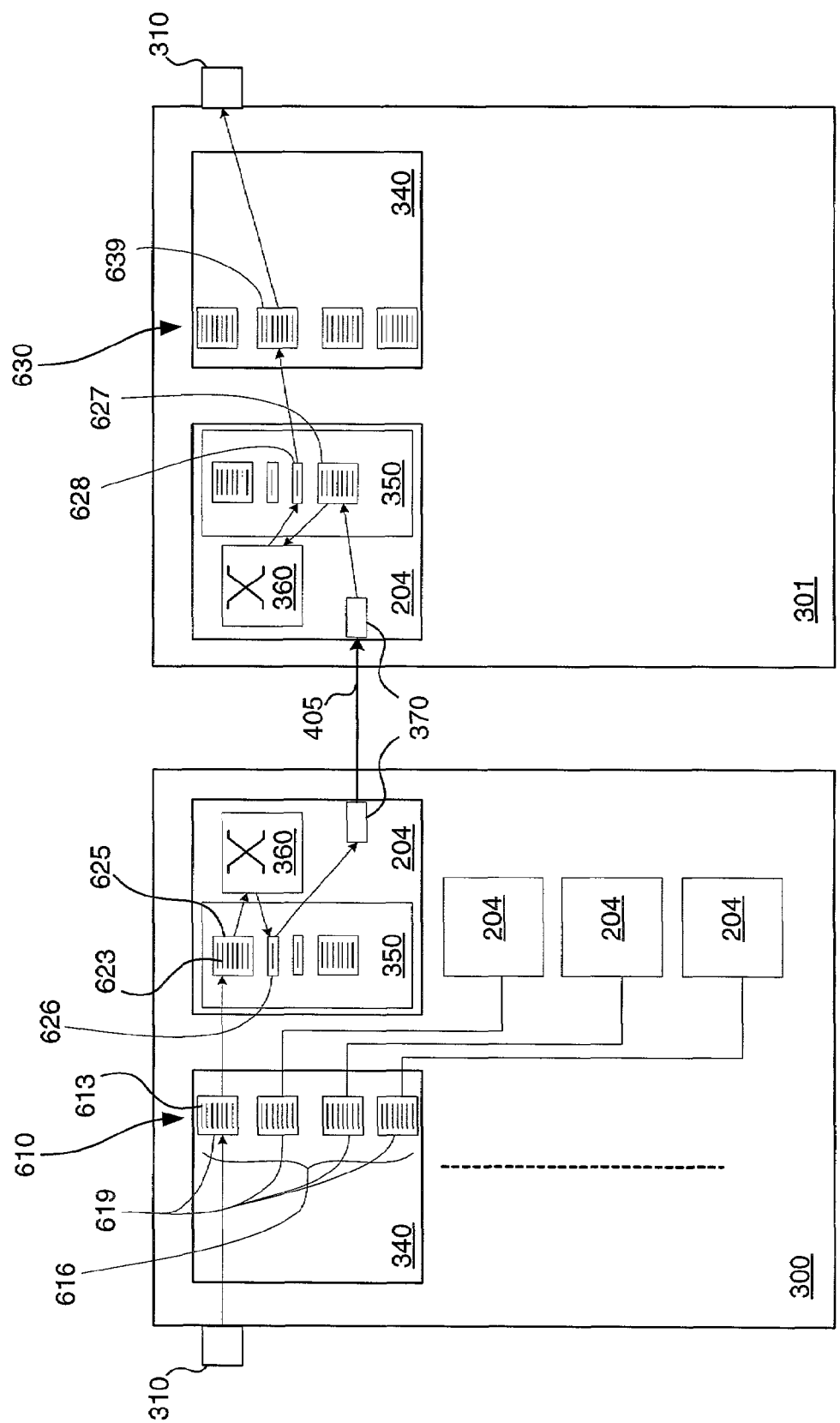
FIG. 6 is a logical diagram of a queue structure for packets switched through a cascade port in accordance with an embodiment of the present invention.

FIG. 6 is a logical diagram of a queue structure for packets switched from a local base rack 300 through a cascade port 370 to a remote base rack 301 in accordance with an embodiment of the present invention. It will be understood that an additional separate queue structure (not shown) exists for local switching in which the input and destination ports 310 are both on base rack 300. FIG. 6 shows that the local base rack 300 includes a first buffer 610 implemented as a plurality of queues 613. In a preferred embodiment the first buffer 610 is divided into 64 sets of queues 616 such that one set 616 is associated with each of the 64 PPs 340. In FIG. 6 only one set of queues 616 for a single PP 340 is illustrated for clarity. More particularly, as shown in FIG. 3, each PP 340 is coupled to an SRAM 342 within which the set of queues 616 are maintained.

In the preferred embodiment each set of queues 616 is further subdivided into four subsets 619 each including 16 queues 613. Each subset 619 corresponds to one of the four switch cards 204 in base rack 300, and each of the 16 queues 613 within each subset 619 corresponds to one of the 16 cascade ports 370 on the corresponding switch card 204 in base rack 300. Accordingly, each queue 613 in each PP 340 is mapped to a unique port 370 in the base rack 300. Thus, in an embodiment in which a base rack 300 includes 64 PPs 340 each associated with a set of queues 616 including 64 queues 613, there are a total of 4096 queues 613. Each queue 613 establishes an independent pathway, referred to as a channel, between a PP 340 and a cascade port 370.

Of the 4096 channels per base rack 300, according to the embodiment described above, any one can be used to communicate between any PP 340 and a specific remote base rack 301. In a preferred embodiment, the interconnect topology of the cascade port 370 enables 16 of the 64 cascade ports 370 to connect the base rack 300 with remote base rack 301. Each PP 340 therefore has 16 channels to communicate with remote base rack 301. Each of these 16 channels is further assigned a priority such that each channel is ordered from most preferable to least preferable. Normally, each port 310 transmits cells over the most preferable channel through a preferred switch card 204 on base rack 300. However, should the preferred switch card 204 fail or become temporarily unavailable, or should the preferred switch card 204 become too heavily loaded compared to other switch cards 204 on the base rack 300, then cells will be transmitted over a less preferable channel with the next highest priority through a less preferred switch card 204.

FIG. 6 also shows that each of the FLCs 350 on each switch card 204 on local base rack 300 includes four buffers 625, 626, 627, and 628 each implemented as a plurality of queues 623. In a preferred embodiment second buffer 625 includes 64 queues 623 to facilitate communications from each of the 64 PPs 340 to crossbar 360. The 64 queues 623 are subdivided into four groups of 16 queues 623. Each queue 623 of each group corresponds to one cascade port 370 on the corresponding switch card 204, and each queue 623 also maps directly to one of the queues 613 on one of the four PPs 340 to which the FLC 350 is attached. In some embodiments a $17^{th}$ FLC 350 on each switch card 204 communicates with the SPC 305 and includes half as many queues 623 in second buffer 625, and thus in the preferred embodiment includes 32 queues 623, divided into two groups of 16 each, in second buffer 625. A third buffer 626 includes one queue 623 to facilitate communications from crossbar 360 to the particular cascade port 370 associated with that FLC 350.

Each switch card 204 on remote base rack 301 includes the same series of buffers as the switch cards 204 on remote base rack 300. When operating to receive packets, however, a fourth buffer 627 is employed to buffer the flow arriving from the cascade port 370. A preferred embodiment includes 17 queues 623 in buffer 627 such that each queue 623 is mapped back to one of the 17 FLCs 350 on the local base rack 300. Mapping each queue 623 to a single and unique FLC 350 enables the control logic of the FLCs 350 to be less logically complex.

Fifth buffer 628 includes a single queue 623 to buffer the flow from crossbar 360 across the backplane 203 (not shown) to a particular PP 340. It will be understood that each FLC 350 typically includes both buffers 627 and 628, and although FIG. 6 shows a path from a buffer 627 through the crossbar 360 and back to a buffer 628 on the same FLC 350, in most instances the path will be from a buffer 627 on a first FLC 350 through the crossbar 360 and to a buffer 628 on a second FLC 350 on line card 204. Buffer 628 is desirable because the bandwidth and service rates of the crossbar 360 and the backplane 203 may not be exactly matched, and buffering is a well known method for joining two communication links operating at different rates or under different protocols. Buffer 626 is desirable for essentially the same reason.

After transmission across the backplane 203 (not shown) of remote base rack 301, packets are buffered in a buffer 630 in an appropriate subset 639 of queues 613 to be routed to the intended destination port 310. In some embodiments a single queue 613 can constitute the entire subset 639, however, in preferred embodiments the subset 639 includes, for example, 16 queues 613. Additional queues 613 in subset 639 allow the cells of multiple packets to assemble in parallel while waiting for destination port 310 to become available for transmission. It will be appreciated that buffers 610 and 630 are present on each PP 340 even though only buffer 610 is shown for the local PP 340 and only buffer 630 is shown for the remote PP 340. Buffers 610 and 630 are structurally equivalent, differing only in that the queues 613 in buffer 610 are mapped to cascade ports 370 as destinations, whereas queues 613 in buffer 630 map to cascade ports 370 as sources.

It will be appreciated that general buffer implementations are well known in the art and a complete discussion would exceed the scope of this application. However, the following discussion is intended to clarify certain aspects of the implementation of the present invention with respect to the preferred embodiment. In the preferred embodiment, a flow is defined as a unique triplet of source port, destination port, and lane, where a lane is a construct of the network protocol that enables multiple signals to co-exist on a single physical wire. Accordingly, the number of flows for an embodiment of the present invention will equal the number of ports 310 enabled to receive a packet multiplied by the number of ports 310 enabled to transmit a packet multiplied by the number of enabled lanes. In preferred embodiments where each port 310 is bi-directional, the number of flows will equal the square of the number of ports 310 multiplied by the number of lanes.

Ideally, each flow has a dedicated queue at each point where buffering is desirable in the processing path from input port 310 on local base rack 300 to destination port 310 on remote base rack 301. Further, each port 310 supports a number of lanes, typically four. By supporting a dedicated queue at each stage of the switching process, each flow is isolated from every other flow and there is said to be zero flow dependency. This isolation enables one flow to experience slow down or congestion without directly affecting another flow. To ideally support an embodiment including 256 bi-directional ports 310, each with 4 lanes, would require 262,144 total flows. It will be appreciated that for an embodiment including 64 PPs 340 to support 262,144 total flows would require each PP 340 to support 4096 flows which would require each PP 340 to be implemented with 4096 queues 613. Likewise, to ideally support an embodiment including 1024 bi-directional ports 310 implemented with 4 lanes and 256 PPs 340 would require each PP 340 to be implemented with 16,384 queues 613.

Supporting such large numbers of queues 613 is not practical using current implementation technologies. Hence, in preferred embodiments a reduced number of queues 613 are implemented, as described above, resulting in a non-zero amount of inter-flow dependency. In a preferred embodiment, as described above, each PP 340 is implemented with 64 queues 613 which represents an acceptable trade-off between implementing a reasonable number of queues 613 and increased inter-flow dependency.

With continued reference to FIG. 6 the flow of a packet from an input port 310 on a local base rack 300 to a destination port 310 on a remote base rack 301 will be described. A packet received by a port 310 on base rack 300 is first buffered in buffer 610 on a PP 340 of a line card 202 in a subset of queues 619 corresponding to a particular switch card 204, and more particularly it is buffered in a queue 613 mapped to a particular cascade port 370. The packet is then transmitted across the backplane (not shown) to the particular switch card 204 where it is buffered in a second buffer 625. Within the second buffer 625 the packet is buffered in the particular queue 623 that maps to the queue 613 from which the packet originated. Thereafter, the packet is routed through the crossbar 360 to the cascade port 370 by way of a third buffer 626 dedicated to the particular cascade port 370 on local base rack 300.

The packet is next transmitted through the cascade port 370 on local base rack 300 across connector 405 to a cascade port 370 on remote base rack 301. After being received into cascade port 370 on remote base rack 301 the packet is buffered in a fourth buffer 627 on a FLC 350 on switch card 204 on remote base rack 301. The particular queue 623 in which the packet is buffered in fourth buffer 627 is one that maps back to the FLC 350 on the local base rack 300 from which it came. Next, the packet is routed through crossbar 360 to a fifth buffer 628 on the particular FLC 350 connected to the appropriate PP 340 for the desired destination port 310. Lastly, the packet is transmitted across the backplane (not shown) of remote base rack 301 to the line card 202 and to a PP 340 on the line card 202 where it is buffered in buffer 630. More particularly, the packet is buffered in a queue 613 of subset 639, where subset 639 is dedicated to the particular destination port 310.

Figure 1:
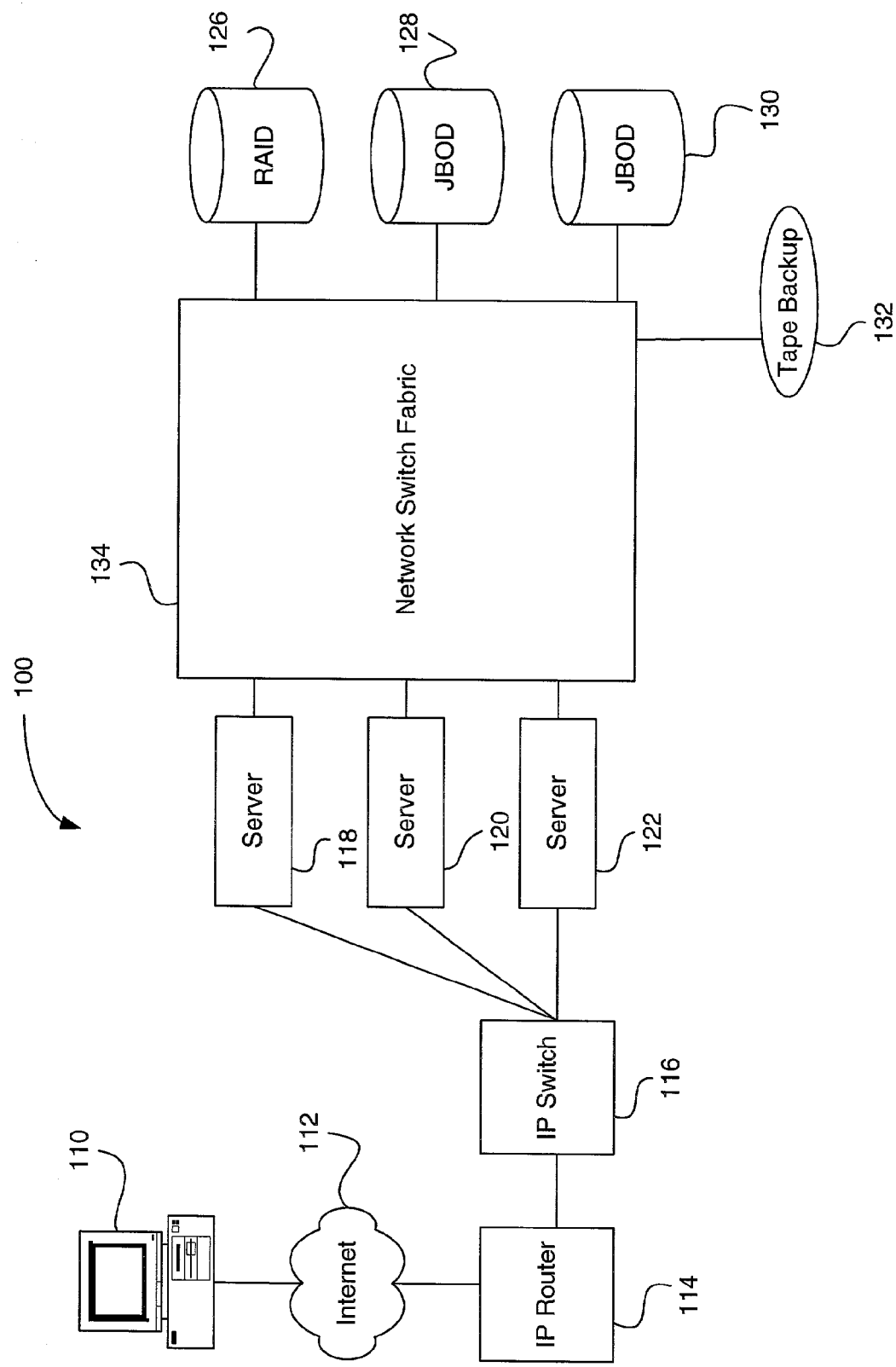
FIG. 1 is a block diagram of a Storage Area Network of the prior art.
Figure 2:
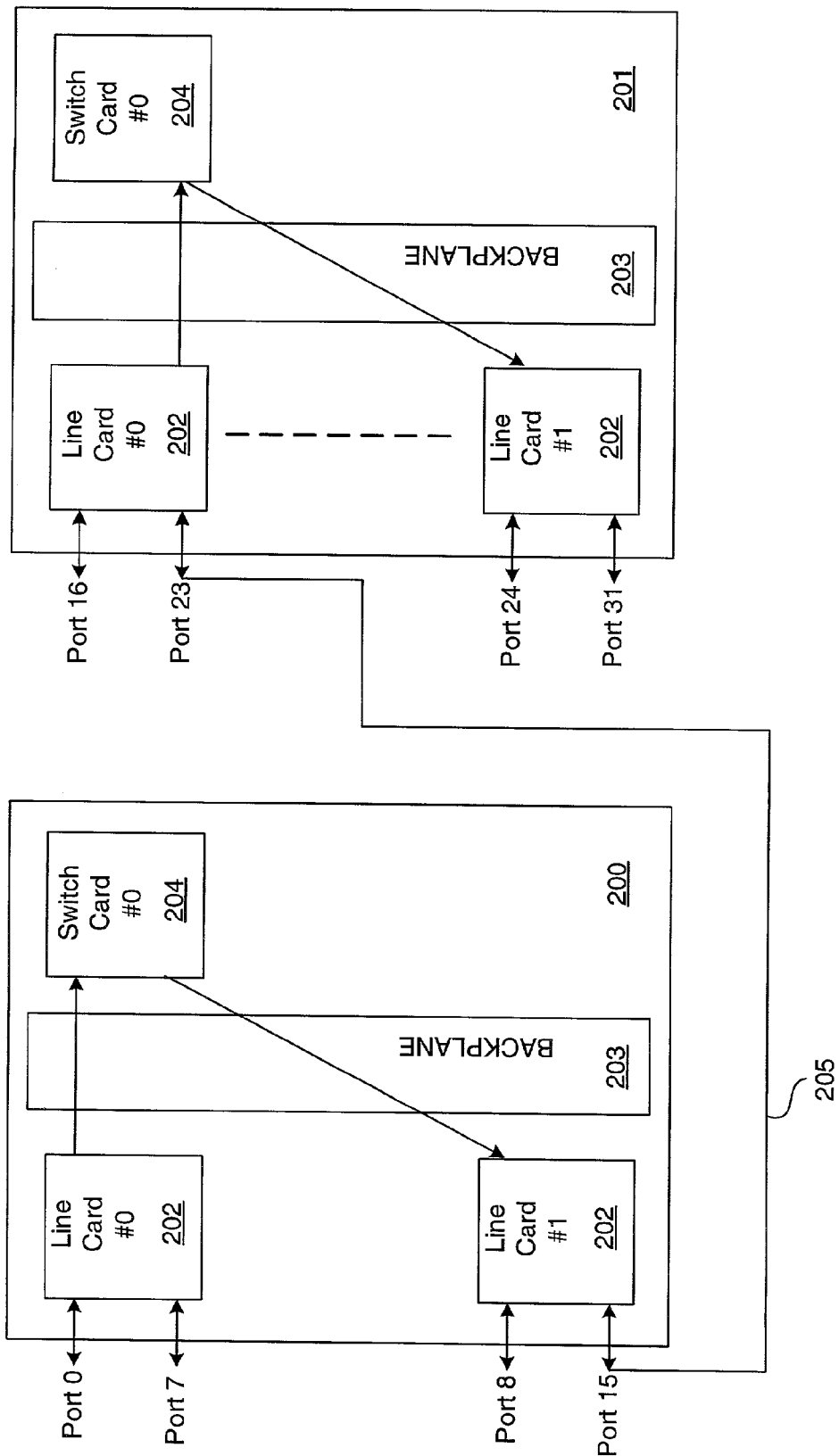
FIG. 2 is a block diagram of two base racks and a cascade connection in accordance with the prior art.
Figure 7:
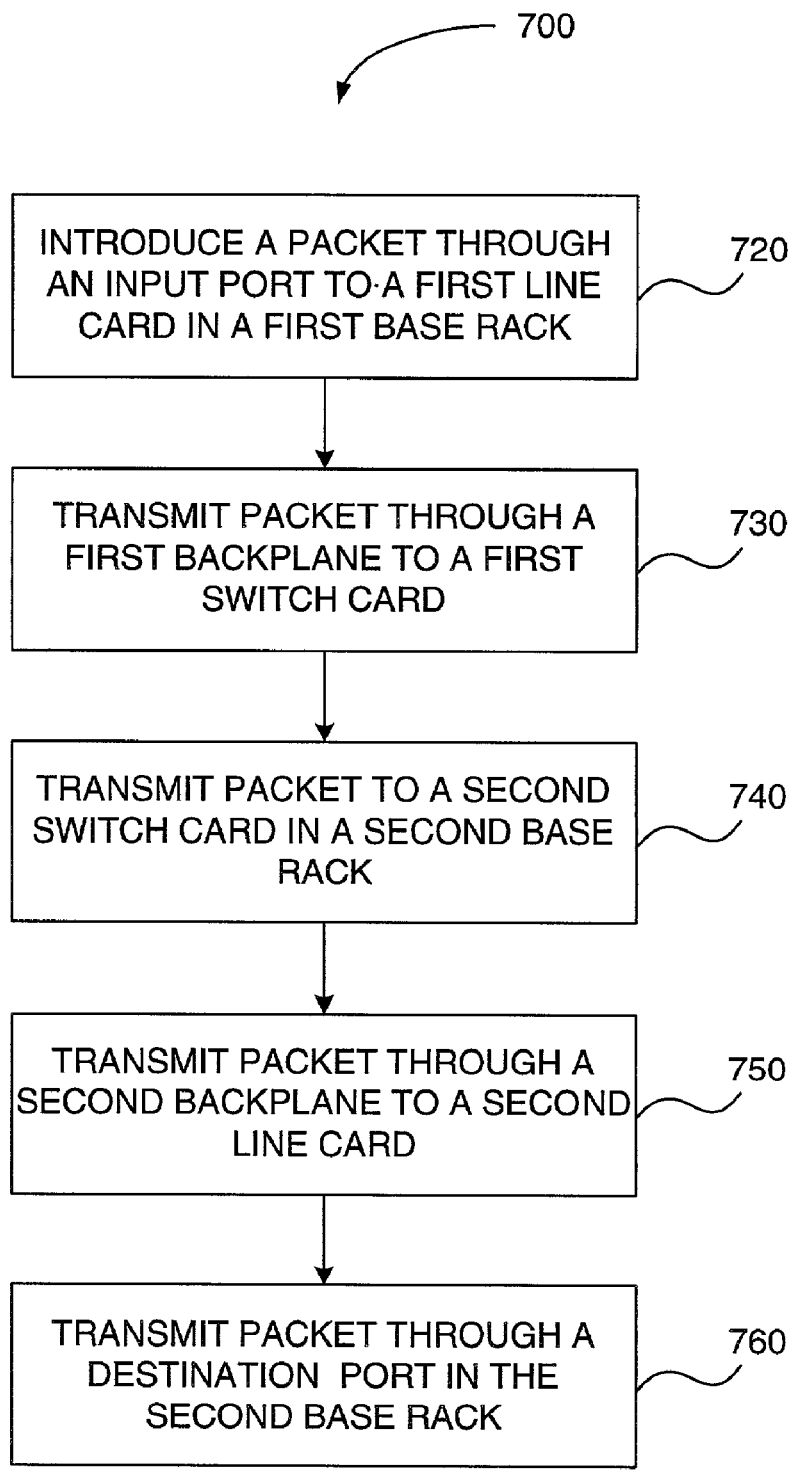
FIG. 7 is a flowchart illustrating a method for switching packets, in accordance with an embodiment of the present invention.

FIG. 7 is a flowchart illustrating a method 700 for switching packets in accordance with the present invention. It is envisioned that a switching device of the present invention will be implemented as part of a larger network of devices such as that shown in FIG. 1 with respect to the prior art, with the switching device of the present invention standing in place of the network switch fabric 134. Accordingly, it will be understood that the switching device will be attached to at least two devices that a packet may be switched between, for example, a server 122 and a tape back-up 132. Typically, the attachments are made by optical fiber cables joined to input and destination ports, however, the present invention can also work with electrically conductive cables such as copper wire.

The method 700 includes introducing a packet to an input port 720, transmitting the packet to a first switch card 730, transmitting the packet to a second switch card 740, transmitting the packet to a second line card 750, and transmitting the packet through a destination port 760.

In act or operation 720 a packet is introduced into the input port on a first line card of a first base rack. Act or operation 720 typically includes converting the packet from an optical signal to an electrical signal in a first GBIC, performing a variety of physical layer conversions in a PHY chip, and any necessary fast-path and/or slow-path packet processing in a first PP. It will be understood that for embodiments of the present invention in which the incoming packet is an electrical signal received from an electrical cable rather than an optical signal from an optical fiber cable, the GBIC is not required.

In act or operation 730 the packet is transmitted through a backplane of the first base rack to a first switch card on the first base rack. Act or operation 730 typically includes a process of cell segmentation. Since switching is performed at a cell-size granularity, each packet is segmented into cells in this act or operation. Cell segmentation includes staging packet data at an SRAM, waiting for packet header processing to be completed, placing a request for backplane arbitration into a priority queue, winning backplane arbitration, reading packet data from SRAM, and segmentation into payloads of preferably 64 bytes or 128 bytes. Act or operation 730 additionally typically includes reading cell-size data from the SRAM and high-speed serial transmission thereof across the backplane to the first switch card. This act or operation further typically includes placing transmitted cells in a buffer on a first FLC on the switch card.

In act or operation 740 cells of the packet are transmitted to a second switch card on a second base rack. This act or operation typically includes reading a destination port number, determining that the destination port number is on the second rack, routing the packet to a first cascade port on the first switch card, and transmitting the cells through the first cascade port and across a connection to a second cascade port on the second switch card on the second base rack. The act or operation also includes buffering the cells at a second FLC on the second switch card.

In act or operation 750 the cells of the packet are transmitted through a second backplane of the second base rack to a second line card. This act or operation typically includes placing the cells in a priority output queue, which is performed by the second FLC. Act or operation 750 also typically includes determining by way of a crossbar scheduler chip when the cells are eligible to use the destination port. The act or operation further typically includes sending the cell data and a corresponding destination address header from the second FLC to a crossbar on the second switch card, routing through the crossbar, buffering the cells at an egress buffer on a third FLC on the second base rack, determining that sufficient credit exists at a receiving queue on the second line card, and high-speed serial transmission across the second backplane.

In those embodiments of the present invention in which the connection between the two cascade ports comprises an optical fiber, act or operation 740 will also include converting the cells to an optical signal in a second GBIC located between the first FLC and the first cascade port. Similarly, in act or operation 750 the cells are typically converted back to an electrical signal from optical signals in a third GBIC located between the second cascade port and a second FLC on the second switch card. However, in those embodiments in which the connection between the cascade ports on the two switch cards comprises an electrically conductive cable, acts or operations 740 and 750 will not typically include converting the cells in second and third GBICs.

In act or operation 760 the packet is transmitted through the destination port in the second base rack. This act or operation typically includes the necessary processing on the second line card on the second base rack. This processing includes cell reassembly in a second PP by removing the cell's header and reassembling the cell data into the packet. Act or operation 760 also includes physical layer conversion in a second PHY chip and conversion of the electrical signal back to an optical signal in a fourth GBIC, both on the second line card. Lastly, act or operation 760 typically includes transmission of the packet as an optical signal through the destination port. It will be understood that where the destination port is connected to a destination device by an electrically conductive cable, conversion back to an optical signal in the fourth GBIC is not necessary.

In the foregoing specification, the invention is described with reference to specific embodiments thereof. It will be recognized by those skilled in the art that while the invention is described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that it can be utilized in any number of environments and applications without departing from the broader spirit and scope thereof. The specification and drawings are, accordingly, to be regarded as illustrative rather than restrictive.

What is claimed is:

1. A method for switching a packet comprising:
    introducing the packet into a first port of a first line card of a first base rack;
    transmitting the packet from the first line card through a first backplane to a first switch card of the first base rack;
    transmitting the packet across a connector which joins a first cascade port on the first switch card to a second cascade port on a second switch card of a second base rack coupled to the first switch card; wherein the connector includes an optical fiber and wherein transmitting the packet from the first cascade port to the second cascade port includes converting the packet to an optical signal;
    transmitting the packet from the second switch card through a second backplane to a second line card on the second base rack; and
    transmitting the packet out of a second port of the second base rack.

2. The method of claim 1 wherein transmitting the packet from the first switch card to the second switch card includes a reading a second port number and determining the second port number is associated with the second base rack.

3. The method of claim 1 wherein transmitting the packet from the first cascade port on the first switch card to the second cascade port on the second switch card further includes buffering the packet on the second switch card.

4. The method of claim 1 wherein introducing the packet into the first port of the first line card includes converting the packet from an optical signal to an electrical signal.

5. The method of claim 4 wherein introducing the packet into the first port of the first line card further includes performing a physical layer conversion.

6. The method of claim 5 wherein introducing the packet into the first port of the first line card further includes performing fast-path packet processing.

7. The method of claim 5 wherein introducing the packet into the first port of the first line card further includes performing slow-path packet processing.

8. The method of claim 1 wherein transmitting the packet through the first backplane includes segmenting the packet into at least one cell.

9. The method of claim 8 wherein segmenting the packet creates a payload of 64 bytes.

10. The method of claim 8 wherein segmenting the packet creates a payload of 128 bytes.

11. The method of claim 1 wherein transmitting the packet through the second backplane includes placing the packet in a priority output queue on the second switch card.

12. The method of claim 11 wherein transmitting the packet through the second backplane further includes scheduling to use the second port.

13. The method of claim 1 wherein transmitting the packet out of a second port of the second base rack includes processing the packet by the second line card.

14. The method of claim 13 wherein processing the packet includes reassembling at least one cell into the packet.

15. The method of claim 13 wherein processing the packet further includes performing a physical layer conversion.

16. The method of claim 13 wherein processing the packet further includes converting the packet from an electrical signal to an optical signal.

17. The method of claim 1 wherein transmitting the packet from the first line card includes buffering the packet in a set of queues associated with a packet processor on the line card.

18. The method of claim 1 wherein transmitting the packet to the first switch card includes buffering the packet in a set of queues associated with a flow control ASIC on the switch card.

19. The method of claim 8 wherein transmitting the packet from the first switch card to the second switch card includes routing the packet through a crossbar on the first switch card and buffering the packet in a first queue dedicated to a cascade port on the first base rack.

20. The method of claim 1 wherein transmitting the packet from the second switch card through the second backplane includes routing the packet through a crossbar on the second switch card and buffering the packet in a queue between the crossbar and the second backplane.

21. The method of claim 1 wherein transmitting the packet through the second backplane to a second line card includes buffering the packet in a queue on the second line card dedicated to a destination port.

22. A method for switching a packet comprising:
introducing the packet into a first port of a first line card of a first base rack;
transmitting the packet from the first line card through a first backplane to a first switch card of the first base rack by segmenting the packet into at least one cell;
wherein segmenting the packet includes:
staging packet data at an SRAM;
waiting for packet header processing to be completed;
placing a request for first backplane arbitration into a priority queue;
winning first backplane arbitration; and
reading packet data from the SRAM;
transmitting the packet from the first switch card to a second switch card of a second base rack coupled to the first switch card;
transmitting the packet from the second switch card through a second backplane to a second line card on the second base rack; and
transmitting the packet out of a second port of the second base rack.

23. The method of claim 22 wherein segmenting the packet additionally includes reading a cell-size from an SRAM and high-speed serial transmission of the at least one cell across the first backplane to the first switch card.

24. The method of claim 22 wherein segmenting the packet additionally includes placing the at least one cell in a buffer on a first Flow Control ASIC (FLC) on the first switch card.

25. A method for switching a packet comprising:
introducing the packet into a first port of a first line card of a first base rack;
transmitting the packet from the first line card through a first backplane to a first switch card of the first base rack;
transmitting the packet from the first switch card to a second switch card of a second base rack coupled to the first switch card;
transmitting the packet from the second switch card through a second backplane to a second line card on the second base rack by:
placing the packet in a priority output queue on the second switch card;
scheduling to use the second port;
sending the packet from a first FLC to a crossbar;
routing the packet through the crossbar; and
buffering the packet at an egress buffer on a second FLC;
transmitting the packet out of a second port of the second base rack.

26. The method of claim 25 wherein transmitting the packet through the second backplane further includes determining a credit at a receiving queue on the second line card end high-speed serial transmission of the packet across the second backplane.

27. A method for switching a packet comprising:
introducing the packet into a first port of a first line card of a first base rack;
transmitting the packet from the first line card through a first backplane to a first switch card of the first base rack;
transmitting the packet from the first switch card to a second switch card of a second base rack coupled to the first switch card by:
routing the packet through a crossbar on the first switch card;
buffering the packet in a first queue dedicated to a cascade port on the first base rack; and
buffering the packet in a second queue associated with a flow control ASIC on the second switch card;
transmitting the packet from the second switch card through a second backplane to a second line card on the second base rack; and
transmitting the packet out of a second port of the second base rack.

* * * * *